United States Patent [19]
Buxton

[11] Patent Number: 5,135,258
[45] Date of Patent: Aug. 4, 1992

[54] TRAILER WITH FUEL TANKS AND MEANS FOR PUMPING FUEL

[76] Inventor: Jon S. Buxton, 4392 Depot, Swartz Creek, Mich. 48473

[21] Appl. No.: 614,992

[22] Filed: Nov. 19, 1990

Related U.S. Application Data

[63] Continuation of Ser. No. 372,825, Jun. 29, 1989, abandoned.

[51] Int. Cl.⁵ .............................................. B60P 3/22
[52] U.S. Cl. .................................... 280/839; 280/830; 137/899
[58] Field of Search ............... 280/830, 831, 834, 837, 280/838, 839, 422; 410/54, 77, 82; 137/899, 359

[56] References Cited

U.S. PATENT DOCUMENTS

| | | | |
|---|---|---|---|
| 1,989,940 | 2/1945 | McGaughan et al. | 280/839 X |
| 2,026,687 | 1/1936 | Lawrenson | 280/831 |
| 2,135,573 | 11/1938 | Gill | 280/837 |
| 2,395,039 | 2/1946 | Crosby | 280/831 |
| 2,421,765 | 6/1947 | Taylor | 280/839 |
| 2,587,456 | 2/1952 | Francis | 410/54 |
| 3,497,707 | 2/1970 | Stewart | 280/422 |
| 3,677,284 | 7/1972 | Mendez | 137/351 |
| 3,731,831 | 5/1973 | Huff | 414/481 |
| 3,874,683 | 4/1975 | Lawson | 280/10 |
| 3,884,255 | 5/1975 | Merkle | 280/834 X |
| 4,014,444 | 3/1977 | Jakel | 414/537 |
| 4,135,596 | 1/1979 | Silba | 280/837 |
| 4,648,764 | 3/1987 | Paulick | 410/77 |
| 4,669,662 | 6/1987 | Bruce | 239/164 X |
| 4,752,177 | 6/1988 | Zenna | 280/656 X |
| 5,002,325 | 3/1991 | Fought et al. | 280/830 |

*Primary Examiner*—Charles A. Marmor
*Assistant Examiner*—Anne Marie Boehler
*Attorney, Agent, or Firm*—Gifford, Groh, Sprinkle, Patmore & Anderson

[57] ABSTRACT

A trailer for towing vehicles such as snowmobiles, motorcycles and the like and having self-contained motor fuel holding tanks and pumping apparatus for providing fuel to snow mobiles, motorcycles and the like that were towed on the trailer. The fuel holding tanks are fitted to the trailer and include a filler tube and one or more outlet pipes. A pump and pump motor is provided and is powered by the hauling vehicle or by a rechargeable battery. A hand-holdable nozzle unit is in fluid communication with the pump for delivery of motor fuel into the tank of the snowmobile, motorcycle, or similar vehicle.

22 Claims, 2 Drawing Sheets

TRAILER WITH FUEL TANKS AND MEANS FOR PUMPING FUEL

This is a continuation of copending application Ser. No. 07/372,825, filed on Jun. 29, 1989, now abandoned.

BACKGROUND OF THE INVENTION

I. Field of the Invention

The present invention relates generally to vehicle trailers. More particularly, the present invention relates to a trailer for towing vehicles such as snowmobiles, motorcycles, all terrain vehicles and the like and the trailer having a self-contained motor fuel holding and pumping apparatus for providing fuel to snowmobiles, motorcycles, all-terrain vehicles, and the like that were towed on the trailer.

II. Description of the Relevant Art

The use of trailers for hauling or towing snowmobiles, motorcycles, all-terrain vehicles ("ATVs") and similar off the road vehicles have become increasingly popular concurrent with the growth of interest in use of such vehicles. Such trailers are hauled behind heavy duty trucks or four-wheel drive vehicles or automobiles.

The user of such off-the-road vehicles prefers to use these vehicles in remote areas, generally in areas which are far distant from the amenities of civilization which may include fuel stations. Accordingly, once the user of an off the road vehicle finds himself with his hauling truck, his trailer and his trailered vehicle out in the wilderness, he may find himself out of fuel.

As a method for acquiring fuel for his off-the-road vehicle, the user may select to remove fuel from the hauling or towing vehicle. However, such a practice is inherently dangerous in that the user may find that he has drawn more fuel from his hauling vehicle tank than is required to return to civilization. Accordingly, his need for motor fuel to power his off the road vehicle places him in an unfortunate position.

As an alternative to this, many off the road vehicle users have elected to carry full or partially full fuel cans in their hauling or hauled vehicles. While this practice eliminates the inherent dangers related to pumping too much fuel out of the hauling vehicle, it presents perhaps even greater dangers in that carrying the cans of highly volatile motor fuel is a dangerous practice which may result in an explosion of one or more of the cans. Motor fuels inherently include volatile fumes which are difficult, if not impossible to contain. Once these cans have been placed inside of a hauling vehicle, the possibility of explosion is extremely great. Also, the inhalation of noxious fumes clearly poses a danger to the driver of the hauling vehicle and to passengers.

Lastly, the off-the-road vehicle user may find that he has to settle for the mileage obtainable from a full tank of gas in his off-the-road vehicle. While this is perhaps the safest of solutions, this circumstance clearly limits the use of such off-the-road vehicle to the mileage possible out of this limited amount of fuel.

Accordingly, the prior approaches to providing the off-the-road vehicle user with fuel as required have failed to eliminate the inconvenience and danger associated with them.

SUMMARY OF THE PRESENT INVENTION

The present invention provides a trailer for towing snowmobiles, motorcycles, ATVs and similar off-the-road vehicles and also having a self-contained motor fuel holding and pumping apparatus for providing fuel to snowmobiles, motorcycles, ATVs and similar off-the-road vehicles. Such use, of course, can be extended to employment in the hauling of antique automobiles or similar special interest vehicles.

The trailer includes a trailer frame structure having a tongue unit for attachment to the hauling vehicle. Furthermore the frame includes at least one axle having wheels rotatably mounted thereto. The wheels have a maximum height from their contact point with the ground and the trailer frame and tank are located lower than the maximum height of the wheels.

At least one fuel holding tank is fitted to the vehicle trailer. This fitting may result in the holding tanks being fitted between or below the frame elements of the frame structure of the trailer. The fuel holding tanks include at least one filler tube for filling thereof by the user at a fuel station before heading out to the wilderness with his off-the-road vehicle or the like, and further includes one or more outlet pipes.

A pump and a pump motor are provided on the trailer and are powered by either the hauling vehicle's electrical system or by a rechargeable battery. Preferably, the pump motor is provided at a point below the fuel storage tank so that a continuous, positive pressure may be maintained on the fuel entering the pumping means, thus making for a more efficient use of pump energy. The pump motor is selectively turned on and off by a switch located preferably on the frame of the trailer. The pump motor would be turned on only when the user anticipates drawing fuel from the tanks and would be turned off at all other times.

A nozzle unit is provided and is interconnected with the pump by means of one or more fuel pipes. The nozzle unit is substantially conventional and in many ways is identical to the nozzle conventionally used on fuel pumps at gasoline filling stations.

The pumping motor delivers liquid under pressure to the nozzle unit.

In operation, the user of the trailer fills the fuel tanks provided in the trailer before departing for a remote location. The fuel remains stored until such time as the user desires to withdraw the fuel from the tanks.

Upon making a decision to withdraw the fuel, the user switches on the pumping motor which substantially pressurizes the fuel directed from the pump to the nozzle unit. Thereupon, the nozzle is emplaced into a fuel tank of a motorcycle or similar off-the-road vehicle. The user then depresses the handle on the nozzle unit and thus allows fuel to enter into the fuel tank being filled. Once the filling operation is completed, the user releases the handle of the nozzle unit, and turns off the pump motor.

Because of the below-the-tank placement of the pump motor, a positive pressure is always applied to the pump motor, thus eliminating the need for priming the pump motor and, in addition, providing a further advantage in that the pump motor would not have to work as hard to draw fuel from the fuel tank in pressurizing the fuel line leading to the nozzle unit.

The above and other objects, advantages and features of the present invention will become more apparent from the following detailed description when read in conjunction with the accompanying drawing.

BRIEF DESCRIPTION OF THE DRAWING

The various features, advantages and other uses of the present invention will become more apparent by referring to the following detailed description and drawing in which.

DETAILED DESCRIPTION OF THE PREFERRED EMBODIMENT OF THE PRESENT INVENTION

Figure 1:
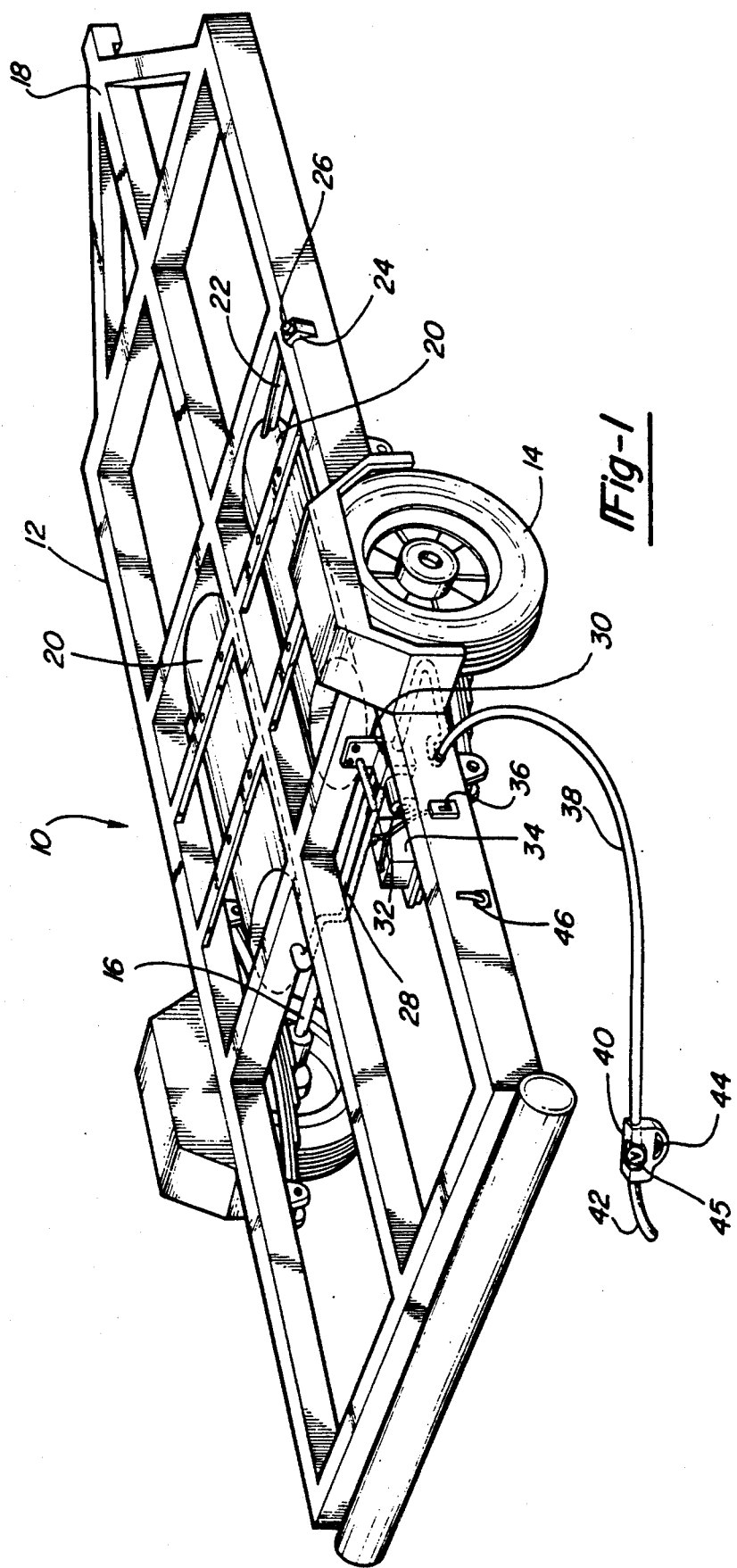
FIG. 1 is a perspective view of an apparatus according to the present invention.

The drawing discloses a preferred embodiment of the present invention. While the configuration according to the illustrated embodiment is preferred, it is envisioned that alternate configurations of the present invention may be adopted without deviating from the invention as portrayed. The preferred embodiment is discussed hereafter.

Referring to FIG. 1, there is shown the vehicle hauling trailer according to the preferred embodiment of the present invention as it would approximately appear in use. The trailer, generally indicated by 10, includes a frame portion 12 and a pair of road wheels 14. The wheels 14 are interconnected by an axle shaft 16. Of course, more than one pair of wheels 14 may be fitted and therefore more than one axle 16 may be employed as required by the weight of the vehicle being hauled. The trailer 10 further includes a trailer hitch tongue portion 18 for removably attaching the trailer 10 to a hauling vehicle (not shown).

Fitted to the approximate underside of the trailer 10 is a pair of fuel storage tanks 20. The tanks 20 may be situated with respect to the frame 12 as shown or may be provided to the front, rear or topside of the frame 12. Furthermore, while a pair of tanks 20 are illustrated, only one tank may be utilized or there may be more than two.

The tanks 20 are refillable by refilling through a filler assembly 22. The assembly 22 includes a filler mouth 24 which would include a removable cap 26. The mouth 24 is wide enough to accomodate a conventional pump nozzle (not shown) as found at fuel stations.

The fuel tanks 20 are fluidly interconnected by a tank connecting line 28. The connecting line 28 allows fluid communication between the tanks 20 to thereby allow fuel to pass from one to another to allow fuel balance. This crossover system also permits filling by a single filler assembly 22 to fill both tanks 20.

The connecting line 28 also interconnects a fuel pump 30. While the pump 30 is preferably externally provided with respect to the tanks 20 and is fixedly attached to the frame 12, the pump 30 may be provided internally with respect to the tanks 20, thereby being provided as a submersible pump.

The pump 30 includes therewith a pump drive motor 32. The drive motor 32 is electrically interconnected with a rechargeable battery 34 and a switch 36 for energizing the pump. As an alternative, shown in FIG. 2, the motor 32, the rechargeable battery 34 and switch 36' may be interconnected through connector 37 with the electrical system of the hauling vehicle. The switch 36 is switched to the "on" position when the pumping operation is selected. The engagement of the switch 36 causes the pump to operate, thus pressurizing a fuel outlet line 38.

Preferably, the pump 30 is externally and strategically situated below the tanks 20, thereby offering many operational advantages, of which two may be noted. First, priming is rendered unnecessary, because the pump will be continually primed by the tank 20. Second, a positive pressure is provided so as to require less pumping action on the part of the pump 30.

It should be noted that while the switch 36 is shown as being situated on the frame 12, the switch 36' may be remotely provided by extension through a switch extension line (not shown) or may be fitted elsewhere.

Figure 2:
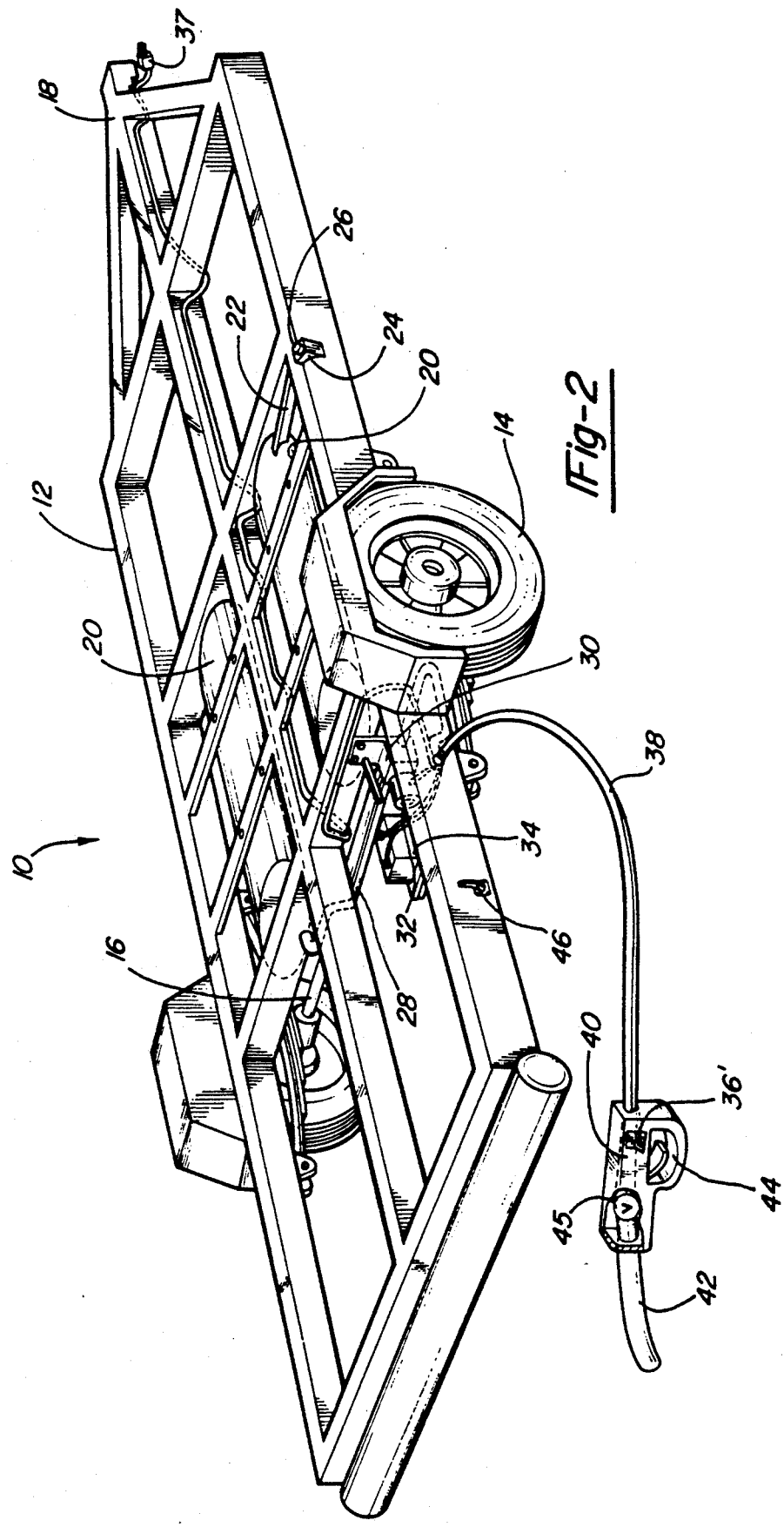
FIG. 2 is a perspective view with a partial section of an apparatus according to the present invention showing certain possible alternatives.

The fuel outlet line 38 is fluidly connected to a nozzle unit 40 which includes a nozzle 42 and a depressible lever 44 which operates a valve 45 (shown in partial sections of both FIG. 1 and FIG. 2). The valve 45 is in fluid communication with flexible lines and is operable by the nozzle operator to release the fuel from the nozzle unit. Furthermore, the switch 36 may be provided on the nozzle unit 40 (this arrangement is illustrated) in FIG. 2 for the convenience of the user.

When the user completes the pumping operation, the outlet line 38 may be coiled and hung on a line hook 46 for reuse at a future time.

Having described my invention, however, many modifications thereto will become apparent to those skilled in the art to which it pertains without deviation from the spirit of the invention as defined by the scope of the appended claims.

I claim:

1. A self-contained trailer assembly removably attachable to a towing vehicle for towing at least one vehicle having an internal combustion engine, said assembly comprising:

a frame having a top side and a bottom side;
said top side having means for carrying said at least one vehicle thereon;
at least one axle mounted to said frame;
wheels rotatably mounted to said at least one axle, said wheels each having a diameter, said diameter having a maximum height;
at least one fuel storage tank mounted to said frame for storing motor fuel;
said top side of said frame and all of said tank being lower than said maximum height of said diameter of said wheel;
a hand-holdable nozzle unit for delivering said fuel to said at least one vehicle;
means for pumping said fuel from said at least one storage tank;
a flexible line for conducting said fuel from said pumping means to said nozzle unit; and
means for selectively energizing said means for pumping.

2. The self-contained trailer assembly according to claim 1 wherein said means for pumping fuel is situated at a point below said at least one fuel storage tank relative thereto so that continuous, positive pressure may be maintained on said fuel entering said pumping means.

3. The self-contained trailer assembly according to claim 2 wherein said means for selectively energizing comprises a switch.

4. The self-contained trailer assembly according to claim 3 wherein said switch is mounted to said frame.

5. The self-contained trailer assembly according to claim 3 wherein said nozzle unit comprises:

a valve in fluid communication with at least one of said plurality of flexible lines, said valve being selectively operable by a nozzle operator; and a nozzle in selective fluid communication with said valve.

6. The self-contained trailer assembly according to claim 5 wherein said energizing means comprises a rechargeable storage battery and interconnecting electric lines.

7. The self-contained trailer assembly according to claim 6 wherein said at least one fuel storage tank is mounted between said frame and said at least one axle.

8. The self-contained trailer assembly according to claim 7 wherein said at least one storage tank is fitted with a fuel filler tube.

9. The self-contained trailer assembly according to claim 5 wherein said energizing means comprises interconnecting wires for interconnection with electric power wires of said towing vehicle.

10. The self-contained trailer assembly according to claim 3 wherein said witch is mounted on said hand-holdable nozzle unit.

11. A self-contained trailer assembly for towing at least one vehicle having an internal combustion engine, said assembly comprising:

a frame having a top side and a bottom side;

said top side having means for carrying said at least one vehicle thereon;

at least a pair of wheels rotatably mounted to said frame structure, said pair of wheels having a diameter with a maximum height;

at least one fuel storage tank mounted to said frame for holding and containing motor fuel;

said top side of said frame and all of said tank being located lower than said maximum height of said diameter;

a hand-holdable nozzle unit for delivering said fuel to said at least one vehicle;

means for pumping fuel from said at least one storage tank;

said means for pumping fuel being situated at a point below said at least one fuel storage tank so that a positive pressure may be maintained on said entering said pumping means;

flexible lines for conducting said fuel from said means for pumping to said nozzle unit; and means for selectively energizing said means for pumping.

12. The self-contained trailer assembly according to claim 11 wherein said means for selectively energizing comprises a switch.

13. The self-contained trailer assembly according to claim 12 wherein said switch is mounted to said frame.

14. The self-contained trailer assembly according to claim 11 wherein said nozzle unit comprises:

a valve in fluid communication with at least one of said plurality of flexible lines, said valve being selectively operable by a nozzle operator; and a nozzle in selective fluid communication with said valve.

15. The self-contained trailer assembly according to claim 14 wherein said energizer means comprises a rechargeable storage battery and interconnecting electric lines.

16. The self-contained trailer assembly according to claim 11 wherein said at least one fuel storage tank is mounted on said bottom side of said frame structure.

17. The self-contained trailer assembly according to claim 16 wherein said at least one storage tank is fitted with one or more fuel filler tubes.

18. The self-contained trailer assembly according to claim 14 wherein said energizing means comprises interconnecting wires for interconnection with the electric power wires of said towing vehicle.

19. The self-contained trailer assembly according to claim 12 wherein said switch is mounted on said hand-holdable nozzle unit.

20. A self-contained trailer assembly for towing a vehicle having an internal combustion engine, said assembly comprising:

a frame structure having a top side and a bottom side;

said top side having means for carrying at least one vehicle thereon;

at least one axle mounted on said bottom side of said frame structure;

wheels rotatably mounted on said axle, said wheels having a diameter with a maximum height;

at least one fuel storage tank mounted to said frame structure for storing motor fuel for said at least one vehicle;

said top side of said frame structure and all of said tank being positioned lower than said maximum height of said wheel diameter;

a hand-holdable nozzle unit for delivery of said fuel to said at least one vehicle, said nozzle unit comprising a manually operable valve and a nozzle;

means for pumping fuel from said at least one fuel storage tank to said nozzle unit;

said means for pumping fuel is situated at a point below said at least one fuel storage tank to maintain a positive pressure on said fuel entering said means for pumping; and means for selectively energizing said means for pumping.

21. A self-contained trailer assembly for towing a vehicle having an internal combustion engine, said assembly comprising:

a frame having a top side and a bottom side;

said top side having means for carrying at least one vehicle;

at least one axle mounted to said frame;

wheels rotatably mounted to said axle, each of said wheels having a diameter, and a maximum height;

at least one fuel storage tank mounted to said frame for storing motor fuel;

said top side of said frame and all of said tank being placed lower than said maximum height of said diameter of each of said wheels;

a hand-holdable nozzle unit for delivering said fuel to said at least one vehicle; and means for pumping said fuel from said at least one fuel storage tank through said nozzle.

22. A self-contained trailer assembly removably attachable to a towing vehicle for towing at least one vehicle having an internal combustion engine, said assembly comprising:

a frame having a top side and a bottom side;

said top side having means for carrying said at least one vehicle thereon;

at least one axle mounted to said frame;

wheels each having a wheel diameter with a maximum height, and said wheels being rotatably mounted to said at least one axle;

said top side of said frame being lower than said maximum height of said wheel diameter;

at least one fuel storage tank mounted to said frame for storing motor fuel, said at least one fuel storage tank being disposed within said frame structure between said top side and said bottom side;

a hand-holdable nozzle unit for delivering said fuel to said at least one vehicle; and
means for pumping said fuel from said at least one fuel storage tank through said nozzle unit.

* * * * *

UNITED STATES PATENT AND TRADEMARK OFFICE
CERTIFICATE OF CORRECTION

PATENT NO. : 5,135,258
DATED : August 4, 1992
INVENTOR(S) : Jon S. Buxton

It is certified that error appears in the above-identified patent and that said Letters Patent is hereby corrected as shown below:

Column 5, Claim 10, line 21, delete "witch" and insert --switch--.

Column 5, Claim 11, line 30, after "frame" delete "structure";

Claim 15, line 62, delete "energizer" and insert

--energizing--.

Signed and Sealed this

Nineteenth Day of April, 1994

*Attest:*

BRUCE LEHMAN

*Attesting Officer*     *Commissioner of Patents and Trademarks*